US006594404B1

(12) United States Patent
Smith (10) Patent No.: US 6,594,404 B1
(45) Date of Patent: Jul. 15, 2003

(54) IMAGE PROCESSING

(75) Inventor: Peter Lionel Smith, Bromley (GB)

(73) Assignee: Electrosonic Limited (GB)

( * ) Notice: Subject to any disclaimer, the term of this patent is extended or adjusted under 35 U.S.C. 154(b) by 0 days.

(21) Appl. No.: 09/433,425

(22) Filed: Nov. 4, 1999

(30) Foreign Application Priority Data

Nov. 19, 1998 (GB) .............................................. 9825379

(51) Int. Cl.$^7$ .............................. G06T 3/40; H04N 9/74
(52) U.S. Cl. ........................ 382/298; 348/581; 345/660
(58) Field of Search ................................. 382/236, 298, 382/299, 254; 345/660, 671; 348/581, 445

(56) References Cited

U.S. PATENT DOCUMENTS

| | | | | |
|---|---|---|---|---|
| 5,202,670 A | * | 4/1993 | Oha ............................ | 345/671 |
| 5,696,848 A | * | 12/1997 | Patti et al. ................... | 382/254 |
| 5,912,710 A | * | 6/1999 | Fujimoto ..................... | 348/445 |
| 6,157,744 A | * | 12/2000 | Nagasaka et al. ........... | 382/236 |
| 6,348,929 B1 | * | 2/2002 | Acharya et al. ............. | 345/660 |

* cited by examiner

Primary Examiner—Jon Chang
Assistant Examiner—Brian Le
(74) Attorney, Agent, or Firm—Fulbright & Jaworski L.L.P.

(57) ABSTRACT

A method and apparatus for resizing a digital video image composed of a plurality of source pixels which are resized to a plurality of target pixels using a technique which comprises:

expressing the point brightness energy associated with each source pixel as an area which spans two source pixel intervals, each said area span having a shape which is proportional to the energy distribution of the source pixel with time;

creating for each target pixel a sample aperture of duration which is a function of the resizing factor, sampling the area spans with each sample aperture to provide, for each target pixel, a set of coefficients, each coefficient representing the proportion of an area span which is within the sample aperture; and scaling, with its associated coefficient, the amount of point brightness energy of each source pixel whose area span appears within any given sample aperture.

20 Claims, 11 Drawing Sheets

IMAGE PROCESSING

IMAGE PROCESSING

This invention relates to image processing and in particular to a method and apparatus for resizing digital video display signals so that the image can be displayed at a different size to the original size of the incoming display signals.

The resizing of digital video display signals is well known and is employed in a number of environments. For example it may be desired to shrink, or minify, an XGA image of 1024×768 pixels for display on a S-VGA display of 800×600 pixels. It may be desired to greatly expand, or magnify or zoom, a digital video signal (existing as, for example, a TV signal or a stored video signal such as on a video cassette or disc) for display on a multiscreen videowall.

Early attempts at resizing involved simple interpolation algorithms which involved omitting pixels and lines during minification and multiplying (repeating) pixels and lines during magnification. This often led to loss of image resolution and aliasing of images. More recent techniques have normally involved a two step process. The original, source pixels are first upsampled (oversampled) to produce intermediate pixels using an interpolator. Second, target pixels are generated from the upsampled pixels using a decimator, generally employing FIR filters. Unfortunately, the latter require substantial amounts of integrated circuitry. Other disadvantages of a two step process with FIR filters is a resolution limit, a limited processing speed and the fact that minification and magnification cannot be conducted using the same chip circuitry.

The present invention provides a new approach to image resizing using a single sampling technique so that source pixels are converted directly into target pixels without intermediate upsampling. The approach enables fast resizing to occur in real time and both minification and magnification may be conducted with the same firmware. Better image resolution is achieved by maintaining the frequency content of the original image to be proportional to the resized picture in order to minimise aliasing whilst preserving image fidelity.

The present invention is based on expressing the amount of energy (brightness) associated with each sampled source pixel to span an area of two samples in duration. The area span has a triangular area that is designed to be proportional to the linear energy distribution of the source pixel. This linear energy representation in a discrete sampled domain avoids the need for the classical intermediate up sampled step in deriving target pixels for any resized factor. From an algorithm based on this principle a set of coefficients are determined that map source to target pixels as a function of resize factor.

The present invention provides a method and apparatus for image processing as specified in the claims hereinafter.

The invention will be more fully described with reference to the accompanying drawings in which.

Figure 1:
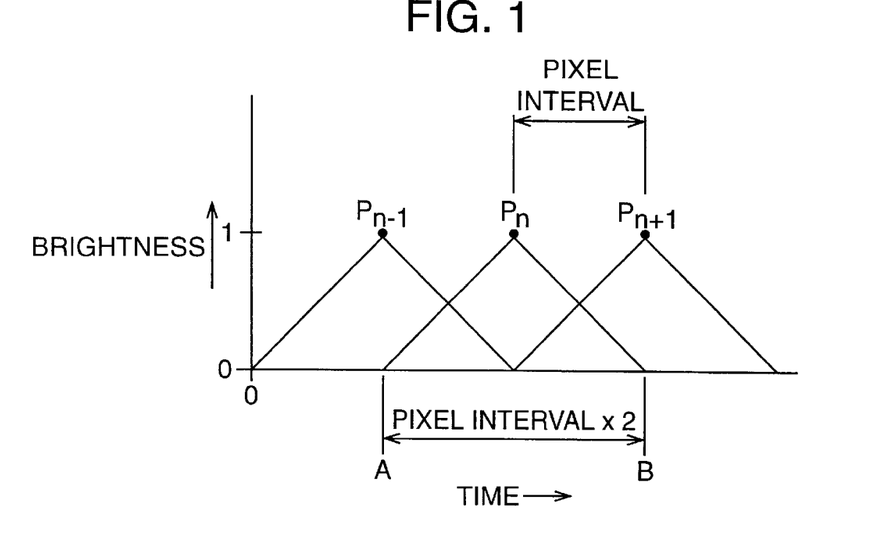
FIG. 1 depicts how the energy distribution of successive source pixels can be depicted by a series of triangular areas.

Referring to FIG. 1, each source pixel of an incoming picture signal is sampled and represented by a triangular area that spans two sample periods and defines its linear energy distribution. The energy, represented by the area of the triangle can be thought of as being represented by an infinite set of linear samples extending vertically, commencing, for the source pixel Pn, at point A (where the energy is zero), increasing in brightness to a maximum at the apex, Pn, and decreasing to zero at point B. Successive pixels, Pn−1, Pn, Pn+1 are shown and it should be noted that point A is vertically below Pn−1 and point B is vertically below Pn+1. If Brightness(max)=1, $$\text{then } Pn \text{ area} = 1/2 \times (pixel\ interval \times 2) \times Brightness(\max)$$
$$= 1/2 \times 2 \times 1$$
$$= 1.$$

The output pixel samples, known as target pixels can be calculated by considering the area contribution of source pixels described between the boundaries of target samples. Note these boundaries will be asynchronous and will produce summations of partial source areas. It will be appreciated that the process of magnification will produce more output pixel samples than source samples, and minification the opposite.

Source/Target Pixel General Representation

Figure 2:
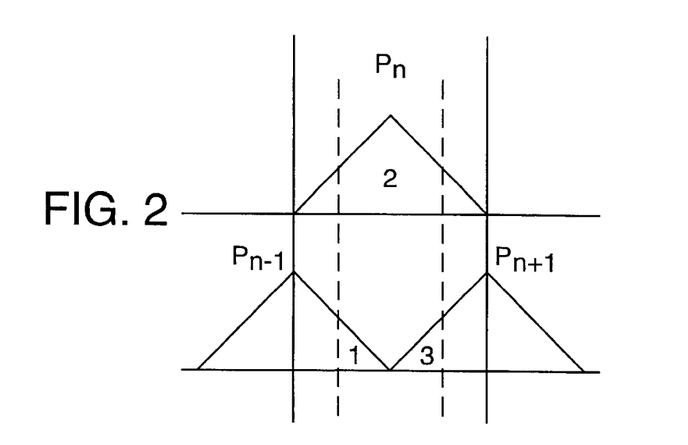
FIG. 2 shows how the target pixel brightness can be calculated from a series of triangular areas.

In order to see more clearly the relationship of the triangular areas, we have adopted the convention of separating adjacent pixels in a vertical direction, so that odd numbered pixels are on one horizontal line and even numbered pixels are on another. This convention is shown in FIG. 2 and will be adopted hereafter. In the following Figures which depict the triangular area spans, for clarity the triangles are shown as each having the same point brightness energy. In other words, the brightness is depicted as an unvarying, unmodulated parameter. In practice, as the brightness varies from pixel to pixel, the heights of the triangles will correspondingly vary.

Referring to FIG. 2, consider three successive source pixels Pn−1, Pn, Pn+1. The respective source pixel distribution is based on a triangular area as shown. To obtain the target pixels, the input pixels must be sampled at a rate commensurate with the magnification/minification required. In FIG. 2 a typical sample interval is shown between the two vertical dashed lines, commencing at a time Sn−1 after the arrival of pixel Pn−1 and finishing at a time Sn after the arrival of pixel Pn, (we talk of each pixel arriving at the time its brightness is maximum).

The brightness of the target pixel for the sampling interval illustrated can be considered to be represented by the proportion of area 1 to the total area of Pn−1 plus the proportion of area 2 to the total area of P(n), plus the proportion of area 3 to the total area of Pn+1.

$$Pcoeff(n-1) = \text{area } 1$$
$$= \frac{(1-Sn-1)^2}{2} \cdot scale$$

$$Pcoeff(n) = \text{area } 2$$
$$= \left[1 - \frac{(Sn-1)^2}{2} - \frac{(1-Sn)^2}{2}\right] \cdot scale$$

$$Pcoeff(n+1) = \text{area } 3$$
$$= \frac{Sn^2}{2} \cdot scale$$

Then the brightness for the target pixel T(n) can be expressed in terms of the source pixels P(n−1), P(n), P(n−1) and coefficients Pcoeff(n−1), Pcoeff(n), Pcoeff(n+1), $$T(n) = Pcoeff(n-1) \times P(n-1) + Pcoeff(n) \times P(n) + Pcoeff(n+1) \times P(n+1)$$

Where P(n−1), P(n), P(n+1) are the brightness values of the source pixels and T(n) is target pixel brightness value We therefore compute the brightness of each target pixel through an algorithm that operates on information from a number of source pixels and corresponding coefficients that will be a function of resize factor and source and target sample phasing.

Relationship of Source Pixel Interval to Sample Interval $$Magnification = \frac{Pixel\ Interval}{Sample\ Interval}$$
$$= \frac{Pn - Pn - 1}{Sn - Sn - 1}$$

But Pn−Pn−1=constant=1
Therefore $$Sample\ Interval = \frac{1}{Magnification}$$

e.g.
Magnification=1, sample interval=1
Magnification=2, sample interval=0.5
Magnification=0.5, sample interval=2
Magnification=1.5, sample interval=0.667
Scale normalises brightness and is the inverse of Sample Interval.

Therefore $$Scale = \frac{1}{Sample\ Interval}$$

Generalised Equations to Simplify Pixel Area Calculations

The complexity of pixel area calculations may be simplified by deriving a series of general equations that work on the principle of differences.

Figure 3:
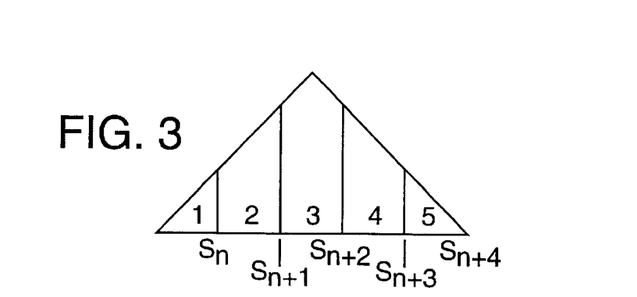
FIG. 3 shows how a single source pixel triangular area can be sub sampled to produce sub areas.

FIG. 3 shows a typical series of samples of a pixel (in this case 5 samples, numbered 1 to 5).

$$\text{Area } 1 = \frac{Sn^2}{2}$$

$$\text{Area } 2 = \frac{(Sn+1)^2}{2} - \frac{Sn^2}{2}$$

$$\text{Area } 3 = 1 - \frac{(Sn+1)^2}{2} - \frac{(1-Sn+2)^2}{2}$$

$$\text{Area } 4 = \frac{(1-Sn+2)^2}{2} - \frac{(1-Sn+3)^2}{2}$$

$$\text{Area } 5 = \frac{(1-Sn+4)^2}{2}$$

These samples, for convenience, have been given names, by reference to the slope of the triangle the sample intersects.

Area 1="up" sample
Area 2="up diff" sample
Area 3="up down" sample
Area 4="down diff" sample
Area 5="down" sample It will be appreciated that any magnification/minification will produce samples whose areas can be defined by one or more of the above 5 areas.

In equations (1) to (5) above, it has been assumed that the source pixel interval is unity. This is impractical for binary arithmetic (it requires floating point arithmetic) and we prefer instead to select a large number which is 2 to an integral power. In our preferred embodiment we have set (normalised) the source pixel interval to 1024 units. To select a larger number would give a better resolution, but for our practical purposes we find 1024 sufficient.

An algorithm has been developed that regularises the process of target calculation and are defined by 9 general equations. The algorithm is scalable in terms of resolution, where "norm" is the scalable constant.

Equation 1

$$sample\_interval(mag) := \frac{norm}{mag} \qquad \text{Equation 1}$$

Equation 2

$$size(mag) = sample\_interval(mag)$$

Equation 3

$$scale(mag) := \frac{norm \cdot mag}{4} \qquad \text{Equation 3}$$

Preferably, we set limits to the magnification from 15.9999 to 1/15.9999

Equations 4 and 5 are exclusively a function of sample interval and are exercised for every sample. They express the portion of the triangular area area for both UP and Down cases.

Equation 4

$$\text{sn\_sqd\_up}(s0) := \frac{(s0)^2}{norm} \qquad \text{Equation 4}$$

Equation 5

$$\text{sn\_sqd\_dn}(s0) := \frac{(norm - s0)^2}{norm} \qquad \text{Equation 5}$$

The remaining 5 equations are a function of Equations 3, 4 and 5 and are selected on the basis of the 5 cases of triangular areas.

Equation 6 (computes area 1 shape FIG. 3)

$$\text{sn\_up}(s0, mag) := \frac{\text{sn\_sqd\_up}(s0) \cdot scale(mag)}{norm \cdot 2}$$

Equation 7 (computes area 2 shape FIG. 3)

$$\text{sn\_up\_diff}(s0, s1, mag) := \frac{(\text{sn\_sqd\_up}(s1) - \text{sn\_sqd\_up}(s0)) \cdot scale(mag)}{norm \cdot 2}$$

Equation 8 (computes area 3 shape FIG. 3)

$$\text{sn\_up\_down}(s0, s1, mag) :=$$

$$\frac{(norm \cdot 2 - (\text{sn\_sqd\_up}(s0) + \text{sn\_sqd\_dn}(s1))) \cdot scale(mag)}{norm \cdot 2}$$

Equation 9 (computes area 4 shape FIG. 3)

$$\text{sn\_down\_diff}(s0, s1, mag) :=$$

$$\frac{(\text{sn\_sqd\_dn}(s0) - \text{sn\_sqd\_dn}(s1)) \cdot scale(mag)}{norm \cdot 2}$$

Equation 10 (computes area 5 shape FIG. 3)

$$\text{sn\_down}(s0, mag) := \frac{\text{sn\_sqd\_dn}(s0) \cdot scale(mag)}{norm \cdot 2}$$

Calculation of Sn

The source pixel interval and the sample pixel interval generally move asynchronously. The value Sn is the time of arrival of the next target pixel boundary after the point of maximum brightness for the previous source pixel. In FIG. 2, for example, point X is at time Sn−1 after the arrival of Pn−1, point Y is at time Sn after the arrival of Pn etc. Except for the special conditions when the source pixel interval and sample pixel interval are integral multiples of one another, the generalised value Sn will vary from target pixel to target pixel and needs to be calculated each time in the algorithm giving target pixel brightness.

We then consider 3 separate conditions:

1. If a sample for a target pixel commences and finishes within the same source pixel interval, then the terminating sample boundary is said not to cross the next source pixel boundary, see FIG. 4A. The source pixel Pn commences at time 0 and the next source pixel Pn+1 commences at time 1024. The target pixel sample, Tn lies wholly within the Pn source pixel interval. The brightness algorithm uses information from three successive source pixels, in this case Pn, Pn+1, Pn+2, but in the circumstance illustrated, only Pn and Pn+1 will provide meaningful "area" information. The contribution from Pn+2 will be zero. We term this a "not next" condition.

Figure 4A:
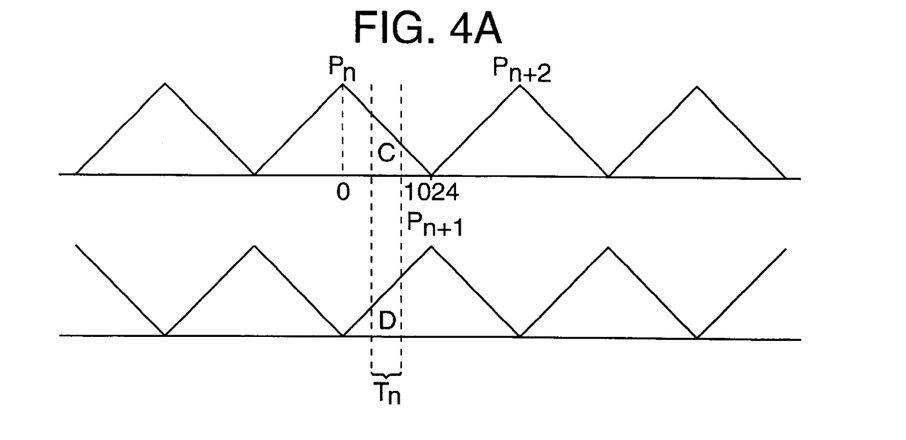
FIGS. 4A, B, and C show three different conditions in which source pixel intervals are related to target pixel intervals.
Figure 4B:
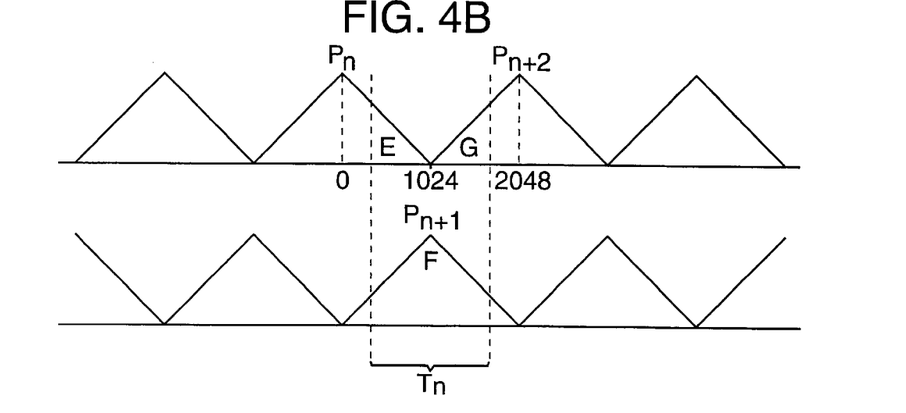

2. When the sample boundary crosses into the next source pixel interval, information about the third successive source pixel is required in the algorithm. This is shown in FIG. 4B. We term this a "next" condition.

Figure 4C:
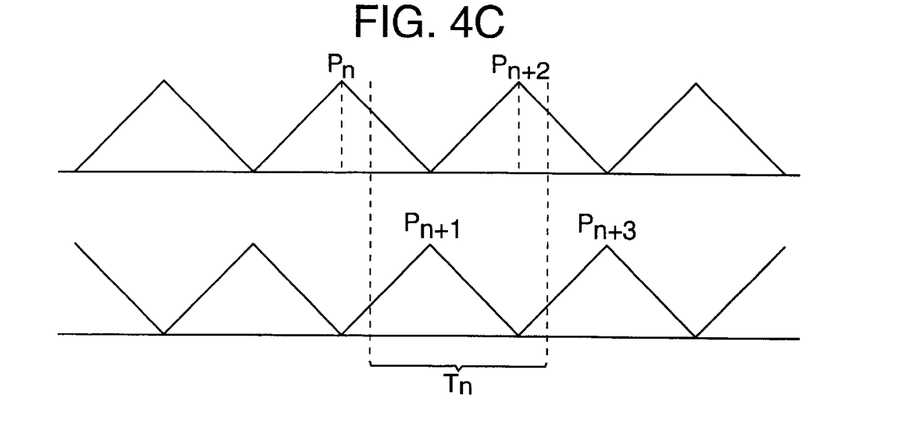

3. When the sample boundary crosses over more than one source pixel interval, the target pixel brightness needs to be computed from the areas of more than 3 source pixels, see FIG. 4C, where the target pixel brightness requires information from source pixels Pn to Pn+3. We term this a "shrink" condition. Since the algorithm can use information from just 3 successive source pixels at any one time, this condition dictates that the algorithm has to be executed a series of times (or passes)—in the case of FIG. 4C, twice—and the result accumulated. Of necessity, a "shrink" condition is simultaneously a "next" condition.

It can be shown geometrically that when a "not next" condition exists, the brightness area computation is made up just of a "down diff" sample and an "up diff" sample. In FIG. 4A, the "down diff" sample is area C, and the "up diff" sample is area D.

It can be shown that when a "next" condition exists, the brightness area computation is made up of a "down" sample, an "up down" sample, and an "up" sample. In FIG. 4B, the "down sample" is area E, the "up down" sample is area F, and the "up" sample is area G.

When a "shrink" condition exists, the "next" algorithm is repeated the appropriate number of times and the results accumulated. This will be explained in more detail below.

The algorithm determines the value of Sn and whether or not a "not next", "next", or "shrink" condition exists from the size signal (11) defined above. The computation for our preferred embodiment is as follows. Accumulate the size signal, by its own value, each time a target pixel falls to be computed. If the value exceeds 4095, but not 8191, then this demonstrates a "next" condition. If the value exceeds 4095, the end number 4095 rolls over, leaving the remainder. For the succeeding target pixel, reaccumulate the size value from the remainder. Keep repeating this. If an any time the accumulated value exceeds 8191, then this demonstrates a "shrink" condition. If the value exceeds 8191, the end number 8191 rolls over leaving the remainder. Then re-accumulate size from the remainder.

At any one time, the accumulated size value can be expressed thus:

| Most significant bit: | 15 ) | when not 0, shrink condition active |
|---|---|---|
| | 14 ) | |
| | 13 ) | |
| | 12 - | when not 0, next condition active |
| | 11 ) | |
| | 10 ) | provides Sn, see below |
| | : ) | |
| | : ) | |
| Least significant bit: | 0 ) | |

The value of the accumulated size value can be expressed in the owing truth table.

| Shrink | Next | Bit No. 15 14 13 | 12 | 11........2,1,0 | Decimal size value |
|---|---|---|---|---|---|
| 0 | 0 | 0 0 0 | 0 | 0........00 | 0 |
| 0 | 0 | 0 0 0 | 0 | 0........01 | 1 |
| 0 | 1 | 0 0 0 | 1 | 0........00 | 4096 |
| 1 | 1* | 0 0 1 | 0 | 0........00 | 8192 |
| 1 | 1 | 0 0 1 | 0 | 0........01 | 8193 |
| : | : | : : : | : | :........:: | : |
| 1 | 1 | 1 1 1 | 1 | 1........11 | 65535 |

*Next is always active when Shrink is active. In fact, it can be shown that the value of the number held in bits 12 to 15 determines the number of times the algorithm must be repeated (and the results accumulated) in a shrink condition.

The value of $Sn$ is obtained from the value held by bits 0 to 11 after any reset has taken place. The twelve bit number is decimated to 10 bits, by mapping bit 11 to bit 9, bit 10 to bit 8, . . . bit 2 to bit 0 and discarding bits 0 and 1. This effectively divides by 4. Although this results in a loss of resolution, it increases processing speed, and is visually not noticeable to the naked eye.

Colour and y-direction Resizing

Nothing has been mentioned so far as to colour, and only resizing in the x scan direction has been described.

Colour is handled simply by carrying out the above technique on each colour pixel, typically red, green and blue, in parallel. Thus the RGB pixels are resized separately using the above described algorithm.

As to resizing in the y direction, the same algorithm is employed where a triangular area operates on a row or line of pixels. Hence the algorithm is truly orthogonal. In place of individual pixel intervals being manipulated, line intervals are manipulated to provide: Lcoeff(n−1), Lcoeff(n), and Lcoeff (n+1) equivalent to Pcoeff(n−1), (Pn)Pcoeff(n) and Pcoeff(n+1). Each "Lcoeff" is used as a multiplier for all the pixels in any one line.

EXAMPLES

It will be seen in the following Examples that, for each target pixel, the summed coefficients amount to approximately 256 (the approximation arises from the rounding errors). The summed coefficients always come to this constant value as this represents the unitised brightness value. In other words, the areas that represent pixel energy that make up the target pixel maintain the original picture brightness.

1. Magnification of 1.5

Figure 5:
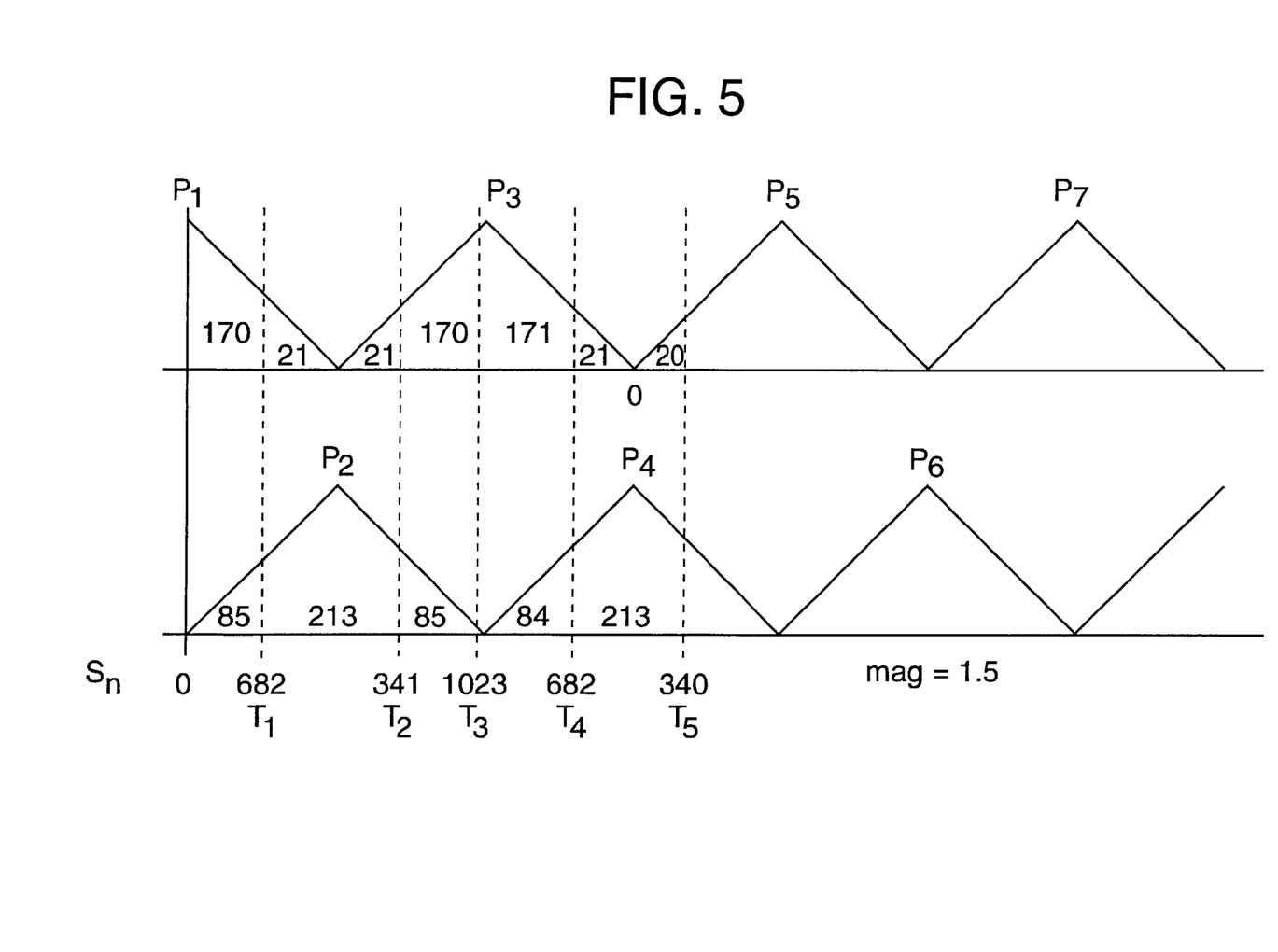
FIG. 5 is an example showing a magnification of 1.5.

The application of the algorithm to a magnification of 1.5 will now be described with reference to FIG. 5 and the general equations 1 to 10 mag=1.5 sample_interval(mag)=683 size(mag)=2731 scale(mag)=384

Using the rules for the algorithm stated above, the calculation for the first 5 target pixels is as follows.

(a) "Not Next", "Next", "Shrink" Conditions & Sn Calculation

| Pixel | Accumulated Size | Condition | Rollover?* | Remainder | Sn** |
|---|---|---|---|---|---|
| T1 | 2728 | not next | N | 2728 | 682 |
| T2 | 5456 | next | Y | 1360 | 340 |
| T3 | 4088 | not next | N | 4088 | 1022 |
| T4 | 6816 | next | Y | 2720 | 680 |
| T5 | 5448 | next | Y | 1352 | 338 |

*Effectively subtract 4096 after "next" and 8192 after "shrink".
**Sn = Remainder/4.

(b) Calculation of target coefficients

For each target pixel, firstly use $Sn$ and $Sn+1$ to calculate Equations 4 and 5 and apply these results to Equations 6 to 10 according to whether the target condition is "not next", "next", or "shrink". T1 is a not next condition and the P(1) coeffs are calculated from equations 7 and 9

T1 s0=0 s1=682 sn_sqd_dn(s0)=1024 sn_sqd_up(s0)=0 sn_sqd_dn(s1)=114 sn_sqd_up(s1)=454 sn_down_diff(s0, s1, mag)=171 sn_up_diff(s0, s1, mag)=85 sn_down_diff(s0, s1, mag)=sn_up_diff(s0, s1, mag)= 256

T2

T2 is a next condition and the P(2) coeffs are calculated from equations 6, 8 and 10 s0=0 s1=682 sn_sqd_dn(s1)=456 sn_sqd_up(s1)=114 sn_down(s0, mag)=21 sn_up_down(s0, s1, mag)=213 sn_up(s1, mag)=21 sn_down(s0, mag)+sn_up_down(s0, s1, mag)+sn_up (s1, mag)=256

T3

T3 is a not next condition and the calculation is identical to T1 s0=341 s1=1023 sn_sqd_dn(s1)=0 sn_sqd_up(s1)=1022 sn_down_diff(s0, s1, mag)=85 sn_up_diff(s0, s1 , mag)=170 sn_down_diff(s0, s1, mag)=sn_up_diff(s0, s1, mag)= 256

T4

T4 is a next condition and the calculation is identical to T2 s0=1023 s1=682 sn_sqd_dn(s1)=114 sn_sqd_up(s1)=454 sn_down(s0, mag)=0 sn_up_down(s0, s1, mag)=171 sn_up(s1, mag)=85 sn_down(s0, mag)+sn_up_down(s0, s1, mag)+sn_up (s1, mag)=256

T5

T5 is a next condition and the calculation is identical to T2 s0=1023
s1=682
sn_sqd_dn(s1)=456
sn_sqd_up(s1)=114
sn_down(s0, mag)=21
sn_up_down(s0, s1, mag)=213
sn_up(s1, mag)=21
sn_down(s0, mag)+sn_up_down(s0, s1, mag)+sn_up(s1, mag)=256

2. Magnification of 0.75

The application of the algorithm to a magnification of 0.75 will now be described with reference to FIG. 6 mag=0.7
sample_interval(mag)=1365
size(mag)=5461
scale(mag)=192

(a) "Not Next", "Next", "Shrink" Conditions & Sn Calculation

| Pixel | Accumulated Size | Condition | Rollover?* | Remainder | Sn** |
|---|---|---|---|---|---|
| T1 | 5460 | next | Y | 1364 | 341 |
| T2 | 6824 | next | Y | 2728 | 682 |
| T3 | 8188 | next | Y | 4092 | 1023 |
| T4 | 9552 | shrink | Y* | 1360 | 340 |
| T5 | 6820 | next | Y | 2724 | 681 |

*Effectively subtract 8192
**Sn = Remainder/4.

(b) Calculation of Target Coefficients

T1

T1 is next condition and the calculation is identical to that of T2 in the magnification=1.5 example above, with the following values s0=0
s1=341
sn_sqd_dn(s0)=1024
sn_sqd_up(s0)=0
sn_sqd_dn(s1)=456
sn_sqd_up(si)=114
sn_down(s0, mag)=96
sn_up_down(s0, s1, mag)=149
sn_up(s1, mag)=11
Sn_down(s0, mag)+sn_up_down(s0, s1, mag)+sn_up(s1, mag)=256

T2

Similarly a next condition
s0=341
s1=682
sn_sqd_dn(s1)=114
sn_sqd_up(s1)=454
sn_down(s0, mag)=43
sn_up_down(s0, s1, mag)=171
sn_up(s1, mag)=43
sn_down(s0, mag)+sn_up_down(s0, s1, mag)+sn_up(s1, mag)=256

T3

Similarly a next condition.

s0=682
s1=1023
sn_sqd_dn(s1)=0
sn_sqd_up(s1)=1022
sn_down(s0, mag)=11
sn_up_down(s0, s1, mag)=149
sn_up(s1, mag)=96
sn_down(s0, mag)+sn_up_down(s0, s1, mag)+sn_up(s1, mag)=256

T4

A shrink condition which requires pixel area information from source pixels P4, P5, P6, P7. This means that the algorithm is repeated once (i.e. two passes) and the results accumulated.

The first pass is taken to the commencement of the P6 time interval. Since this has gone past the boundary where P5 finished this is a next condition.

The second pass takes the algorithm to the finishing boundary for T4 as a second next condition (n.b. when a shrink condition exists, as mentioned above, each pass is treated as a next).

1st Pass

For the first pass, the algorithm operates as a next condition on P4, P5, P6 using the boundary where P5 finishes as the limit for taking the area calculation to. This means that S1 is 1023 for the first pass.

s0=1023
s1=1023
sn_sqd_dn(s1)=0
Sn_sqd_up(s1)=1022
sn_sqd—dn(s1)=0
sn_up_down(s0, S1, mag)=96
sn_up(s1, mag)=96
pass1=sn_down(s0, mag)=sn_up_down(s0, s1, mag)=sn_up(s1, mag)

$2^{nd}$ Pass

For the second pass, the algorithm operates as a next condition on P5, P6, P7 s0=1023
s1=341
sn_sqd_dn(s1)=456
sn_sqd_up(s1)=114
sn_down(s0, mag)=0
sn_up_down(s0, s1, mag)=53
sn_up(s1, mag)=11
pass2=sn_down(s0, mag)+sn_up_down(s0, s1, mag)=sn_up(s1, mag)
pass1+pass2=256

T5

Another next condition
s0=341
s1=682
sn_sqd_dn(s1)=114
sn_sqd_up(s1)=454
sn_down(s0, mag)=43
sn_up_down(s0,s1, mag)=171
sn_up(s1, mag)=43
Sn_down(s0, mag)+sn_up_down(s0, s1, mag)+sn_up(s1, mag)=256

Figure 6:
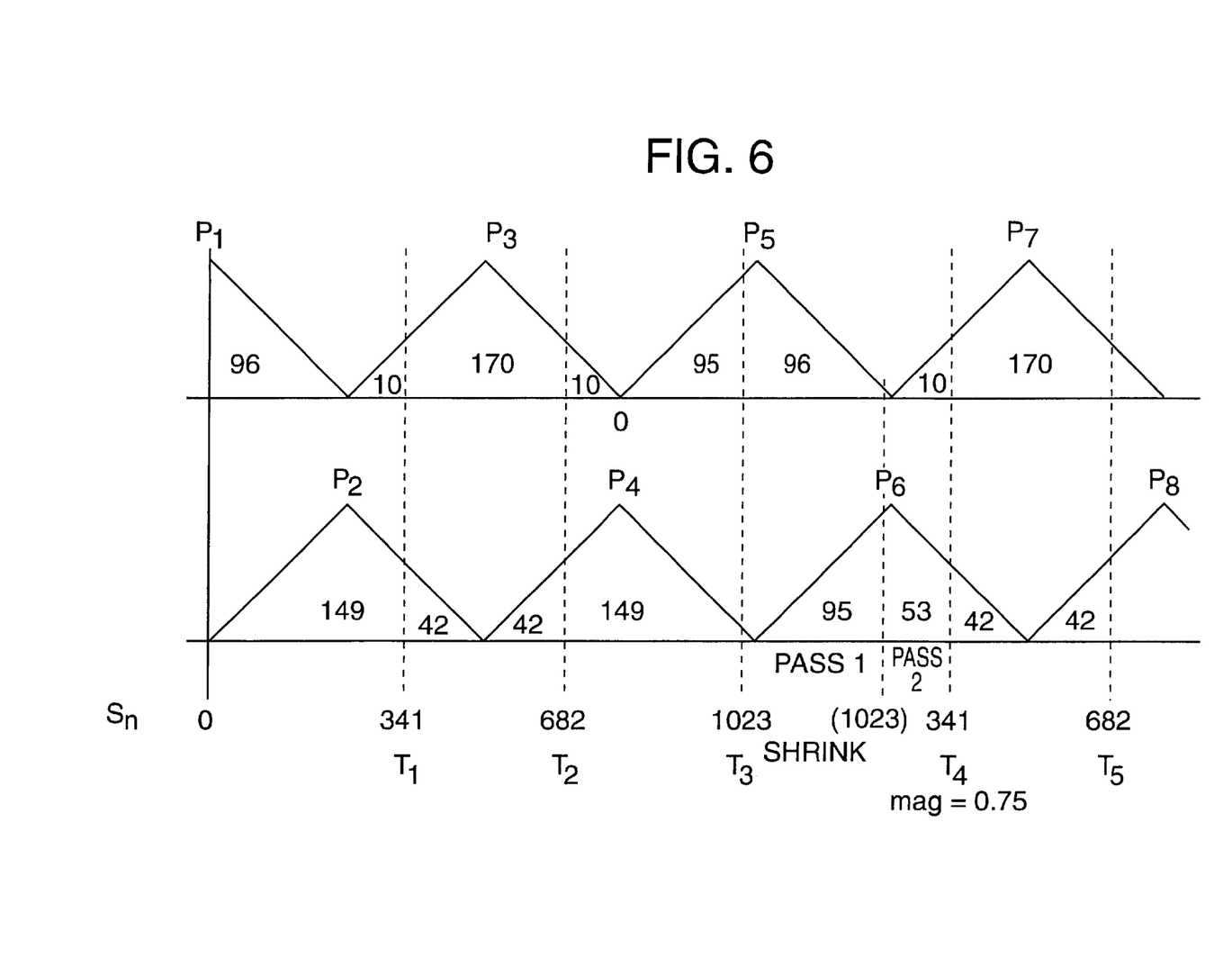
FIG. 6 is an example showing a magnification of 0.75 (i.e. a minification)

The various (Pn)coeff areas, Sn values are shown on FIG. 6.

A convolver, which accepts source pixels in a raster scan of successive lines, and from which computes target pixels in target lines in accordance with the invention will now be described, by way of example, with reference to FIGS. 7 to 16. In this description various clock and reset signals have been omitted for clarity. The skilled person will appreciate how to implement such signals without difficulty.

Figure 7:
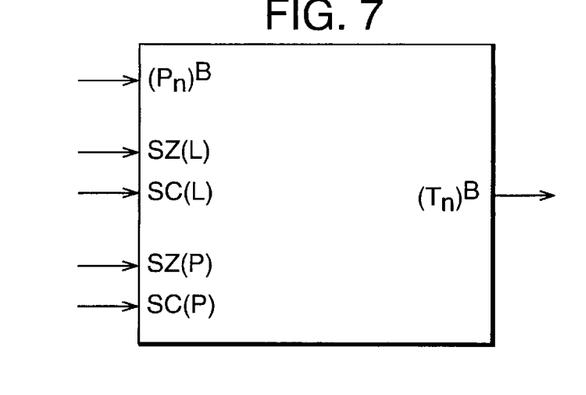
FIG. 7 is a block diagram showing the complete inputs and outputs to an apparatus forming a preferred embodiment of the invention which is given by way of example.

The complete convolver showing the various essential inputs and outputs is shown in FIG. 7. The brightness value for each individual source pixel arrives as an 8-bit signal P(n). As resizing is anamorphic and different magnifications can be used in the x- and y-directions, separate inputs for the size signal equation (11) above, SZ(L) for line sizing and SZ(P) for pixel sizing exist, as well as separate corresponding scale values, SC(L) and SC(P). The output is a target pixel brightness signal of 8 bits width, T(n).

Figure 8:
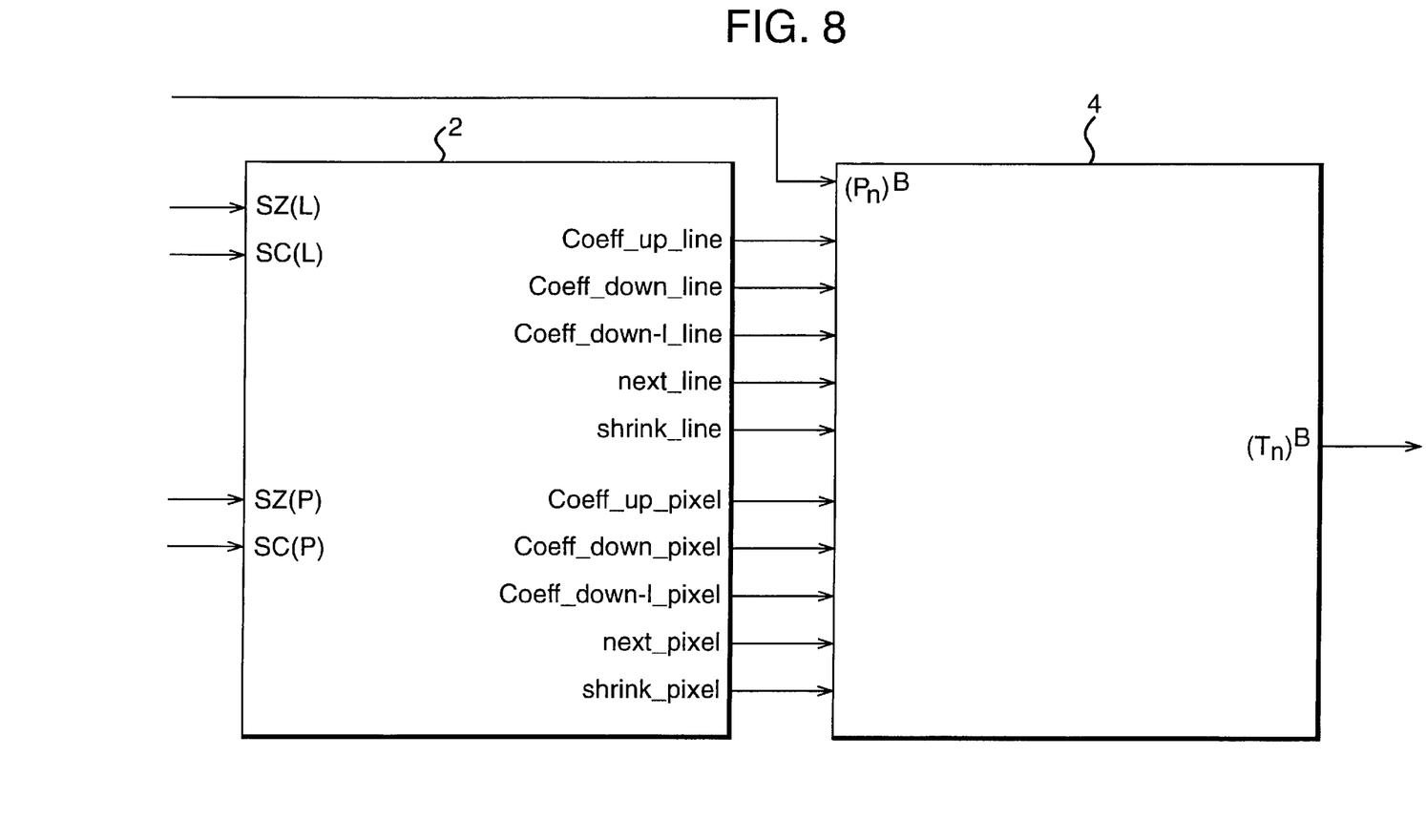
FIG. 8 is a more detailed block diagram showing how the apparatus is broken up into two blocks: a control print section and scaler(s)

The convolver can be broken down into two sections, as shown in FIG. 8. The two sections consist of a control print section 2 and (in the case of a convolver handling R, G and B colour pixels) three scalers in parallel, only one of which, 4, has been shown for clarity. One scaler operates on R pixels, a second on G pixels, and a third on B pixels. They operate identically in parallel, hence only one needs to be described.

Figure 9:
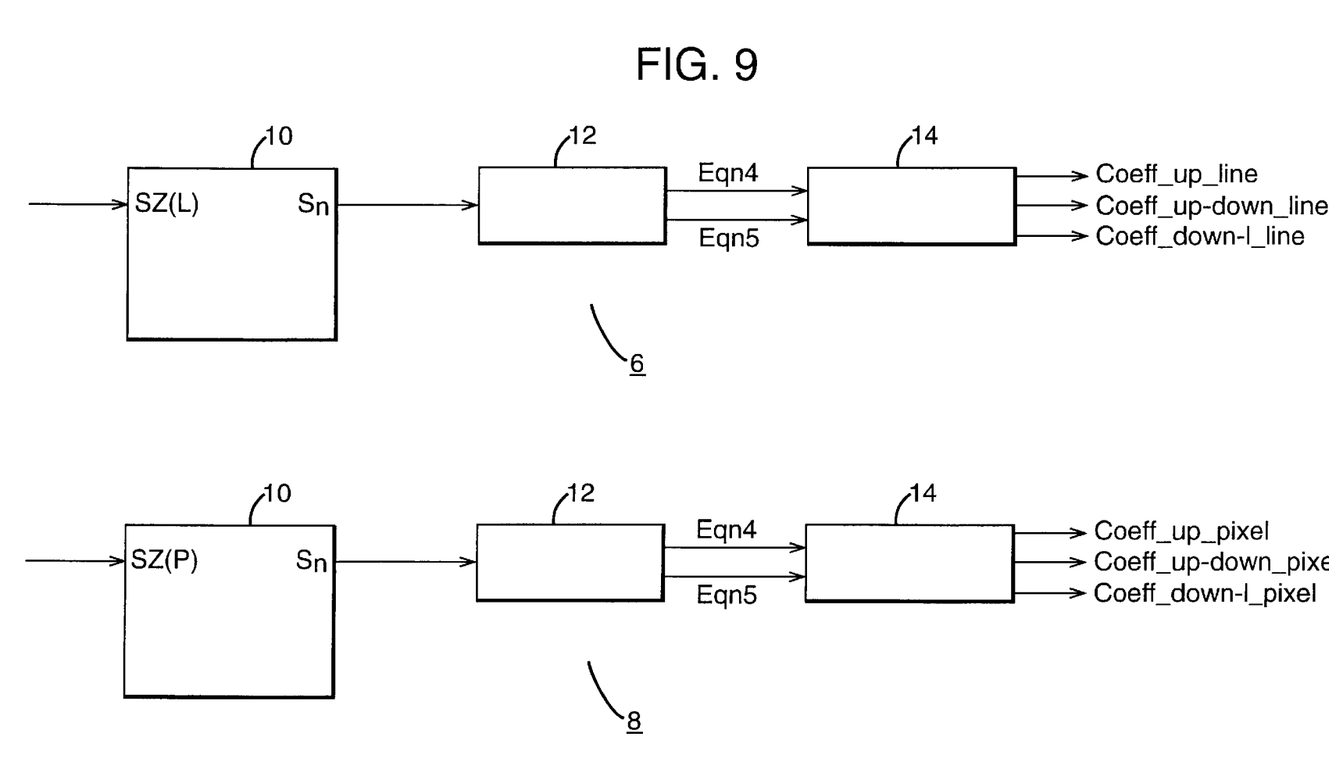
FIG. 9 is a schematic circuit diagram detailing the control print section of FIG. 8.

The control print section 2 is shown in more detail in FIG. 9. It consists of a line channel 6, to provide the parameters for scaling complete lines of pixels (i.e. in the y-direction) and a pixel channel 8 to provide the parameters for scaling each individual pixel (i.e. in the x-direction). Each channel includes a sample number, Sn, generator circuit 10. This generates the sample interval for the target lines and pixels. This is followed by an Sn-sqd circuit 12 which generates the equation 4 and 5 values which are themselves used to generate equations (6) to (10) above. Circuit 12 leads to a coefficient switch circuit 14 which generates, in each channel, three signals:

Coeff-up

Coeff-up-down

Coeff-down-1.

Figure 10:
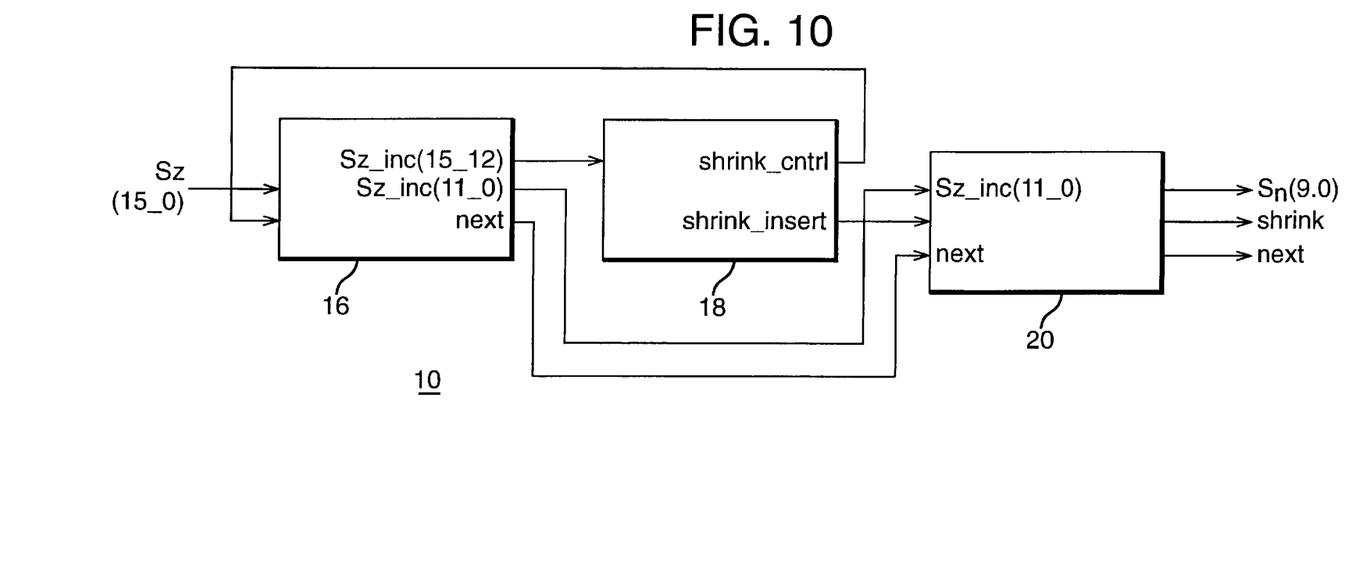
FIG. 10 is a circuit diagram of the sample number, Sn, generator block of FIG. 9.

The Sn generator circuit 10 is shown schematically in FIG. 10. It consists of a size increment block 16, a shrink hold block 18, and an Sn output block 20. The manner in which these blocks operate will be described below.

Figure 11:
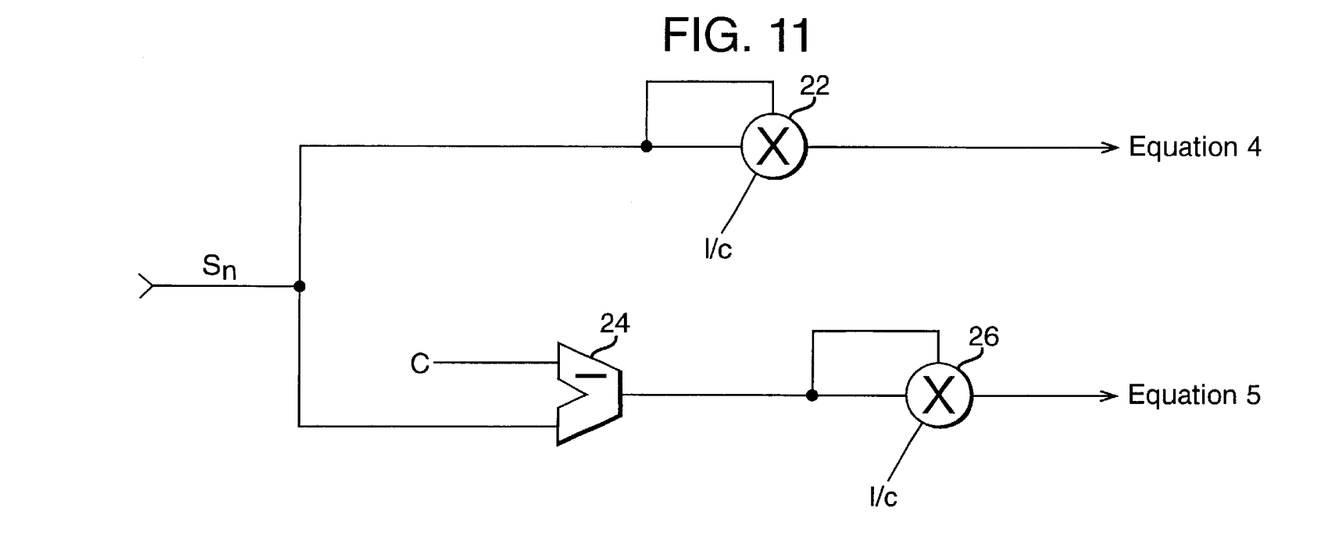
FIG. 11 is a circuit diagram of the Sn-sqd block of FIG. 9.

The Sn-sqd circuit 12 is shown in more detail in FIG. 11. It consists of a multiplier 22 which squares the Sn input signal to provide $(Sn)^2$ for the equation 4 signal, a subtractor 24 which generates, in our example, (1024-Sn), with 1024 being input as a constant, C, to the subtractor, and a further multiplier 26 to provide $(1024-Sn)^2$ for the equation 5 signal. A divide-by-1024 is also provided by multipliers 22, 26.

Figure 12:
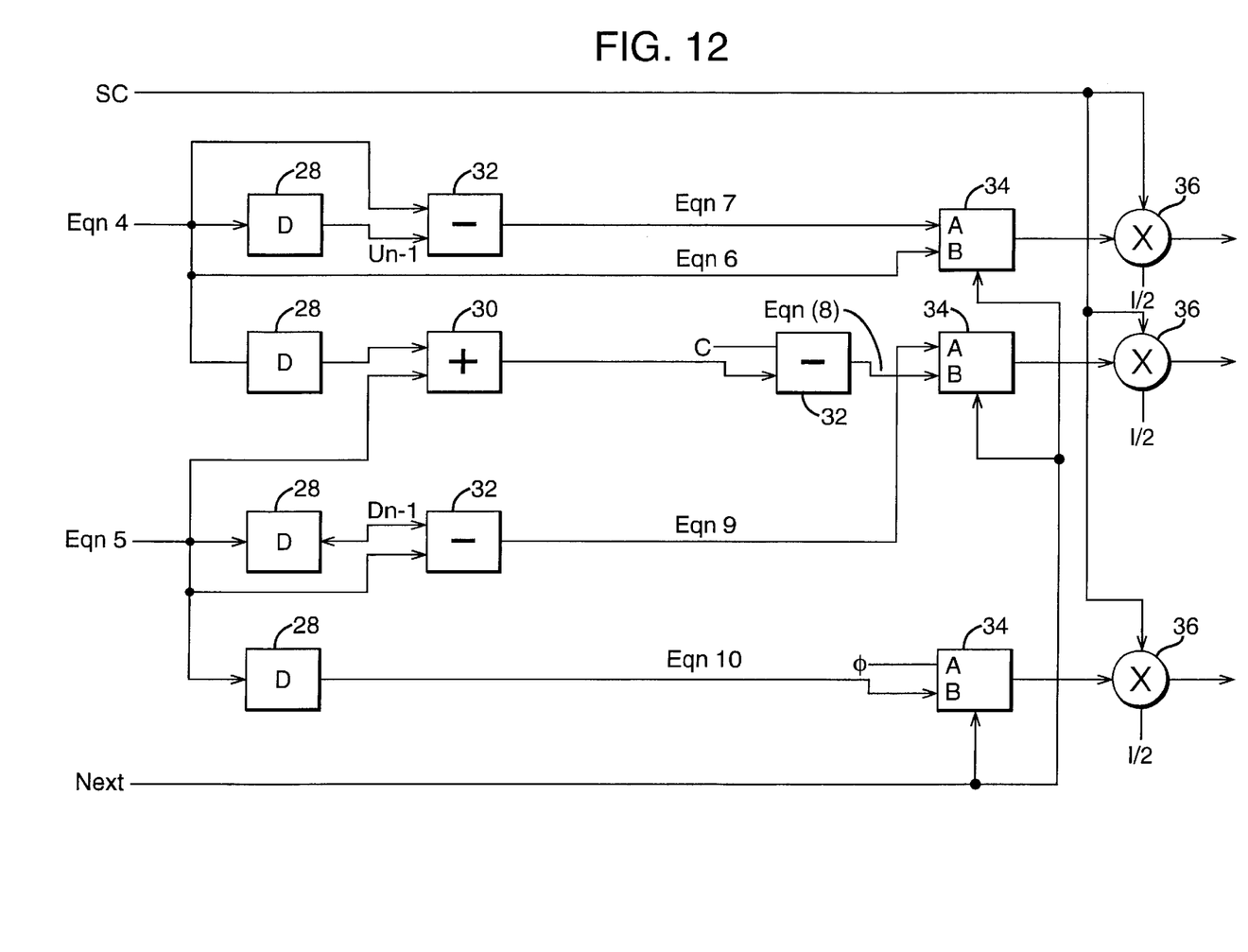
FIG. 12 is a circuit diagram of the coefficient switch block of FIG. 9.

The coefficient switch circuit 14 is detailed in FIG. 12. It consists of sample delays 28, an adder 30, subtractors 32, switches 34 and multipliers 36. As mentioned above circuit 14 provides 3 outputs and these are provided according to the following truth table:

| Next | Coeff-up | Coeff-up-down | Coeff-down-1 |
|---|---|---|---|
| Not active | Sn-up-diff | Sn-down-diff | — |
| Active | Sn-up | Sn-up-down | Sn-down |

Thus, using the generalised equations (6) to (10) above, the coefficient switch circuit generates selected ones of the equations dependant on whether or not Next is active (i.e. whether or not a next condition exists).

| Next | Coeff-up | Coeff-up-down | Coeff-down-1 |
|---|---|---|---|
| not active | eqn(7) | eqn(9) | — |
| Active | eqn(6) | eqn(8) | eqn(10) |

Thus, depending on whether or not the next bit (12th bit) in the 16 bit accumulated size value is active (binary 1), various of the equations (6) to (10) are routed to the three outputs of switch 14. The next signal acts as the selector for switches 34 causing the appropriate signal to be outputted. Thus, when Next is active, the switches 34 select channels B causing the values for equations (6), (8) and (10) to be forwarded to the multipliers, for multiplication by the SC scale value. The multipliers also provide a divide-by-2 function (which appears in the denominators of equations(6) to (10)). When Next is not active, the values for equations (7) and (9) are routed. Next is also forced to be active when a shrink condition exists.

Figure 13:
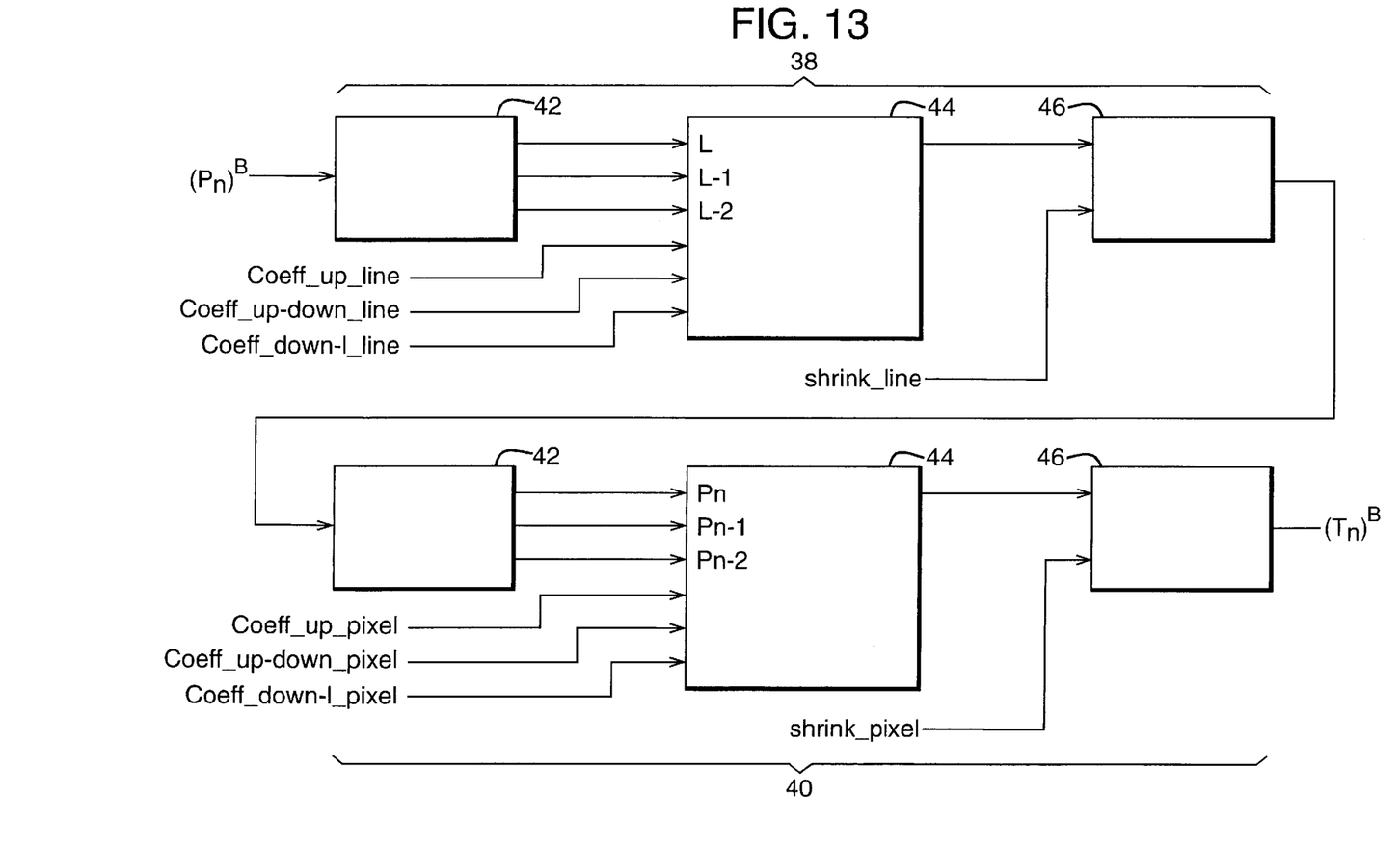
FIG. 13 is a circuit diagram of the scaler block of FIG. 8.

Reverting to FIG. 8, where a scaler 4 is shown, detail of the latter is shown in FIG. 13. Each (of the three) scalers consists of a line scaler 38 in series with a pixel scaler 40. The line and pixel scalers work independently of one another. The line scaler scales in the y-direction and acts upon complete lines of pixels in blocks, with the same scaling factor being applied to each individual pixel in the same line.

The line-scaled pixels are then operated on by the pixel scaler. The latter scales in the x-direction and scales successive individual pixels one by one. Each of the line and pixel scalers consist of a delay 42, a summer 44, and an accumulator 46.

Figure 14:
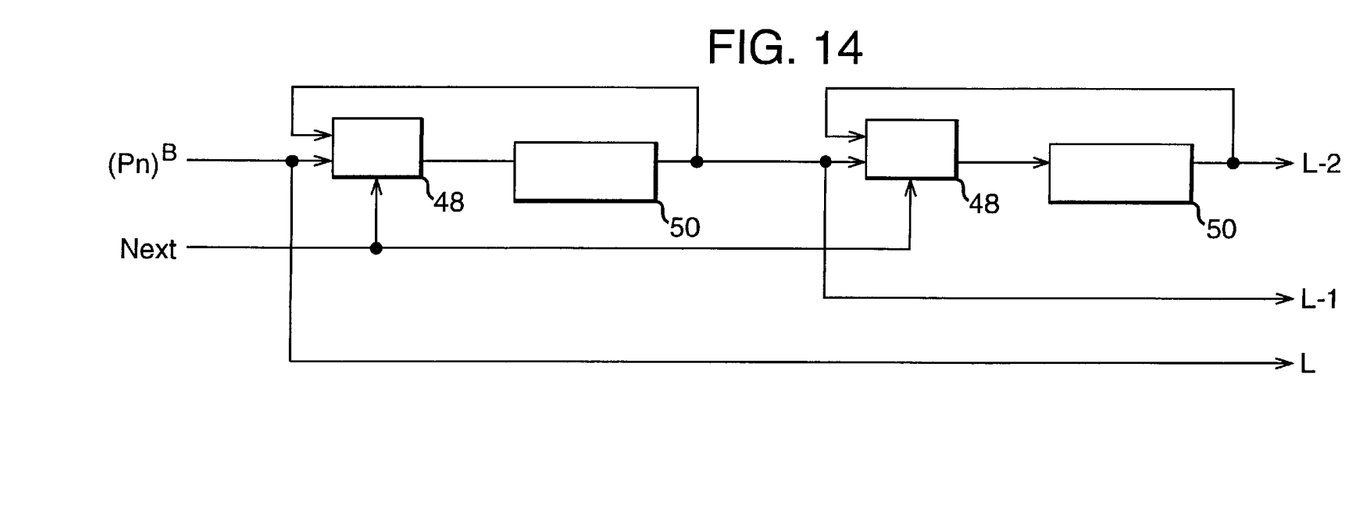
FIG. 14 is a circuit diagram of the line delay block shown in FIG. 13.

The line delay is shown in FIG. 14. It consists of switches 48 and line delays 50. The line delay provides outputs consisting of the brightness data for all the pixels in three successive lines, shown as L, L–1, L–2. This provides the requirement for the algorithm used in the invention which processes line data from three successive lines simultaneously. Each line delay consists of a series of stored pixels of one line length.

The pixel delay (shown in FIG. 13) is identical to the line delay except that it delays individual successive pixels rather than complete lines of pixels. It provides the output for three successive pixels Pn, Pn–1, Pn–2. This again meets the requirement of the algorithm. Each pixel delay is for one pixel.

Figure 15:
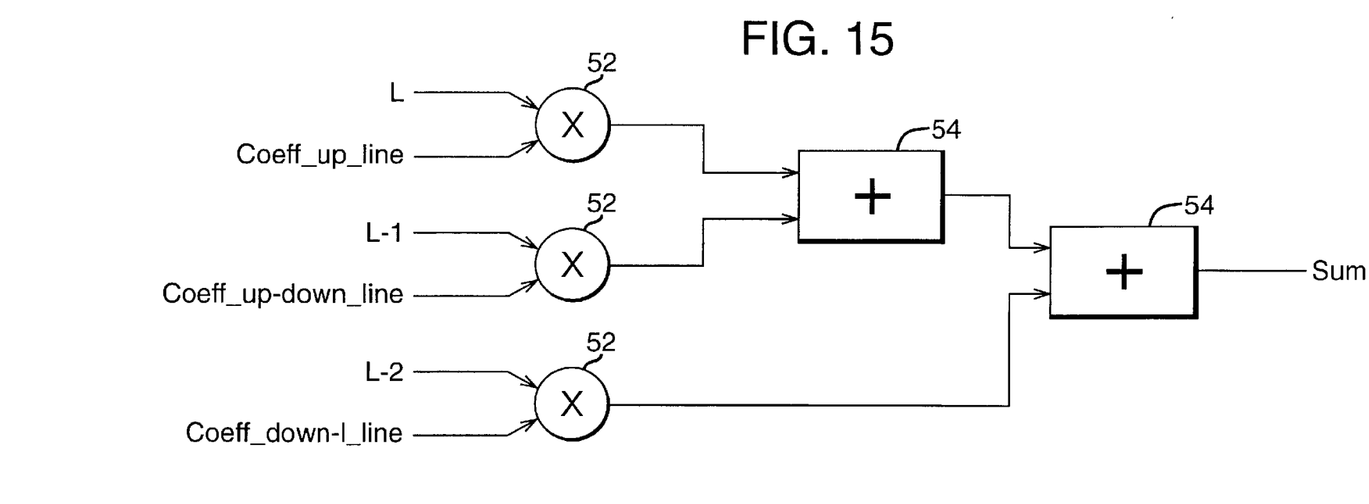
FIG. 15 is a circuit diagram of the line summer block shown in FIG. 13.

The line summer is shown in FIG. 15. It consists of three multipliers 52 and two adders 54. The summer firstly multiplies the pixel brightness values for each pixel in a line by the coefficient value provided by the coefficient switch circuit 14, i.e. by the result of the computation of the appropriate one of the equations (6) to (10). Each pixel in any one line is multiplied by the same coefficient. The results of these three multiplications are then summed to provide the appropriate brightness information for each line of target pixels.

The pixel summer (shown in FIG. 13) is identical to the line summer except that it multiplies the brightness values of individual pixels against coefficient values which will normally differ from successive pixel to pixel. Each pixel is operated on independently.

Figure 16:
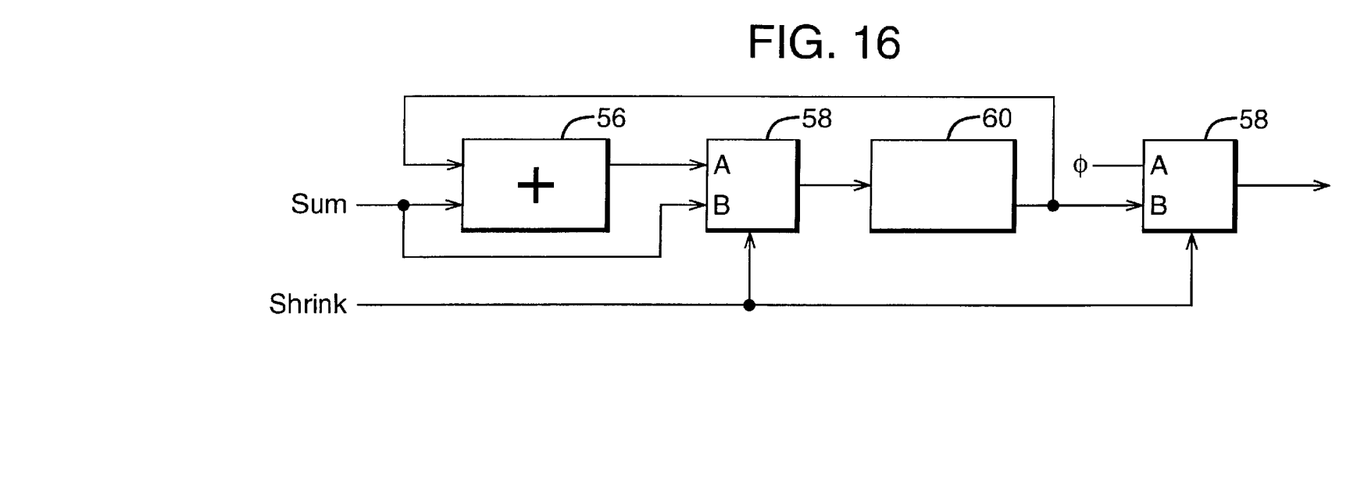
FIG. 16 is a circuit diagram of the line accumulator block shown in FIG. 13.

The line accumulator is shown in detail in FIG. 16. It consists of an adder 56, switches 58, and a line delay 60. It receives the summed output of the summer (FIG. 15) and is controlled by the shrink signal. The accumulator is only active when a shrink condition exists, i.e. only when any one or more of the top three bits of the 16-bit accumulated size signal are active (not 0). When a shrink condition does not exist, the accumulator is non-functional and the sum input is passed straight through and out as an 8-bit target line consisting of a series of 8 bit pixels. When a shrink condition exists, the summer 56 accumulates the sum values from successive sets of three lines for as many passes as is required to satisfy the shrink condition prevailing. When the accumulator is active, the shrink signal forces the output of the second switch to zero: no target line data is available at the output until sufficient passes have taken place to satisfy the shrink. The accumulated sum in adder 56 is then released as the output.

The pixel accumulator is identical to the line accumulator except that it operates on the sums resulting from 3 successive pixels rather than sums resulting from 3 successive lines of pixels. The output of the pixel accumulator is a series of pixels which have thus been scaled line-by-line wise in the y-direction and pixel-by-pixel wise in the x-direction. The output of the pixel accumulator is thus the final resealed target pixels.

The convolver operates to implement the algorithm as follows.

Referring to FIG. 10, the Sn generator circuit 10 receives the size (Sz) value (which is a constant for each magnification). The size increment block 16 increments this value by itself for each target interval and provides the 12-bit (bits 0–11) incremented value as one output, a next condition output (active if bit 12=1), and a 4-bit (bits 12 to 15) value.

The shrink hold block 16 receives the 4-bit output and provides a shrink-cntrl output which returns to control the size increment block 16. When shrink-cntrl is active, the size increment block is held active for the appropriate number of shrink cycles (passes). The following truth table details the correspondence of Sz-inc(15-12), Next, and shrink-hold.

| SZ-Inc(15-12) | Next | Shrink Hold Cycles |
| --- | --- | --- |
| 0000B | Not active | 0 |
| 0001B | Active | 0 |
| 0010B | Active | 1 |
| 0011B | Active | 2 |
| 0100B | Active | 3 |
| : | : | : |
| 1110B | Active | 13 |
| 1111B | Active | 14 |

The Sn output block 20 provides control outputs as a function of Sz-Inc(11-0), shrink-insert and Next. When shrink-insert is active (=1) the Sn(9-0) value—decimated from Sz-inc—is held at 1023 (see T4 in the example for the magnification=0.75 given above).

The Sn-sqd circuit 12 receives the 10-bit Sn value and generates, for successive pixels or lines, the equation 4 and 5 values. From these, the coefficient switch circuit 14 generates the values from the various equations (6) to (10) dependent on whether or not Next is active.

The scaler 4 receives the pixel brightness information, pixel-by-pixel, and the three coeff values. In the line scaler 38, as has been described, complete lines of pixels are multiplied by the same coefficient value and this is generated for each of three successive lines in summer 44. If shrink is active, these sums are accumulated for the appropriate number of cycles (passes) in line accumulator 46—see the last truth table above.

The operation is then repeated on each pixel in the pixel scaler 40 to give the ultimate target brightness values for each pixel T(n).

What is claimed is:

1. A method of resizing a digital video image composed of a plurality of source pixels, the source pixels being resized by a resizing factor to a plurality of target pixels, which method comprises:

expressing the point brightness energy associated with each source pixel as an area which spans two source pixel intervals, each said area span having a shape which is proportional to the energy distribution of the source pixel with time;

creating for each target pixel a sample aperture of duration which is a function of the resizing factor;

sampling the area spans with each sample aperture to provide, for each target pixel, a set of coefficients, each coefficient representing the proportion of an area span which is within the sample aperture; and scaling, with its associated coefficient, the amount of point brightness energy of each source pixel whose area span appears within any given sample aperture, to provide the amount of point brightness energy from that source pixel to be assigned to the target pixel of that aperture.

2. A method according to claim 1, wherein said scaling step comprises, for each source pixel whose area span appears within any given sample aperture, multiplying a point brightness value by its associated coefficient value, and summing the multiplied results.

3. A method according to claim 1 or 2, wherein said sampling step comprises sampling simultaneously three successive adjacent area spans.

4. A method according to claim 3, wherein, when said sample aperture is of a size to include more than three area spans, to conduct said sampling simultaneously more than once, to provide more than one set of three coefficients, and after scaling each corresponding step of three amounts of point brightness energy, to accumulate the results thereof.

5. A method according to claim 1, where each area span has a triangular shape.

6. A method according to claim 5, wherein each triangular area is an isosceles triangle whose base depicts time and whose height depicts brightness energy, first and second apices of the triangle being on the base line and separated by two pixel intervals, the third apex being disposed midway between the first and second apices, spaced from the baseline at the position representing maximum brightness of the pixel.

7. A method according to claim 1, wherein said sampling step comprises calculating the proportion of an area span within a sample aperture on the basis of differences in areas.

8. A method according to claim 1, wherein the source pixels are converted directly into target pixels without intermediate upsampling.

9. An apparatus for resizing a digital video image composed of a plurality of source pixels, the source pixels being resized by a resizing factor to a plurality of target pixels, which apparatus comprises:

means for expressing the point brightness energy associated with each source pixel as an area which spans two source pixel intervals, each said area span having a shape which is proportional to the energy distribution of the source pixel with time;

means for creating for each target pixel a sample aperture of duration which is a function of the resizing factor;

means for sampling the area spans with each sample aperture to provide, for each target pixel, a set of coefficients, each coefficient representing the proportion of an area span which is within the sample aperture; and means for scaling, with is associated coefficient, the amount of point brightness energy for each source pixel whose area span appears within any given sample aperture, to provide the amount of point brightness energy from the source pixel to be assigned to the target pixel of that aperture.

10. An apparatus according to claim 9, wherein said scaling means comprises, for each source pixel whose area span appears within any given sample aperture, means for multiplying a point brightness value by its associated coefficient value, and means for summing the multiplied results.

11. An apparatus according to claim 9 or 10, wherein said sample means comprises means for sampling simultaneously three successive adjacent area spans.

12. An apparatus according to claim 11, wherein said sampling means comprises, when said sample aperture is of a size to include more than three area spans, means to conduct said sampling simultaneously more than once, to provide more than one set of three coefficients, and after scaling each corresponding set of three amounts of point brightness energy, means to accumulate the results thereof.

13. An apparatus according to claim 9, wherein said expressing means comprises means to express each area span has a triangular shape.

14. An apparatus according to claim 13, wherein each triangular area is an isosceles triangle whose base depicts time and whose height depicts brightness energy, first and second apices of the triangle being on the base line and separated by two pixel intervals, the third apex being disposed midway between the first and second apices, spaced from the baseline at the position representing maximum brightness of the pixel.

15. An apparatus according to claim 9, wherein said sampling means comprises means for calculating the portion of an area span within a sample aperture on the basis of differences in areas.

16. An apparatus according to claim 9, wherein the source pixels are converted directly into target pixels without intermediate upsampling.

17. A method of resizing a digital video image composed of a plurality of source lines each containing a series of pixels, the source lines being resized to a different plurality of target lines each containing a series of pixels, which method comprises operating the method of claim 1 by substituting source lines for individual source pixels.

18. A method of resizing a digital video image composed of a plurality of source pixels arranged in lines, the source pixels being resized to a plurality of target pixels, which method comprises resizing individual source pixels to target pixels by the method of claim 1 and, orthogonally and independently thereto, resizing the source lines by the method of claim 17.

19. An apparatus for resizing a digital video image composed of a plurality of source lines each containing a series of pixels, the source lines being resized to a different plurality of target lines each containing a series of pixels, which apparatus comprises the apparatus according to claim 9 wherein each means is adapted to operate on source lines in place of individual source pixels.

20. An apparatus for resizing a digital video image composed of a plurality of source pixels arranged in lines, the source pixels being resized to a plurality of target pixels, which apparatus comprises the apparatus of claim 9 for resizing individual source pixels to target pixels, in combination with, and for operating orthogonally and independently thereto, an apparatus as claimed in claim 19 for resizing source lines.

* * * * *